C. E. ARCHER & E. C. HUMPHREYS.
SIGNALING DEVICE FOR VEHICLES.
APPLICATION FILED JULY 28, 1916.

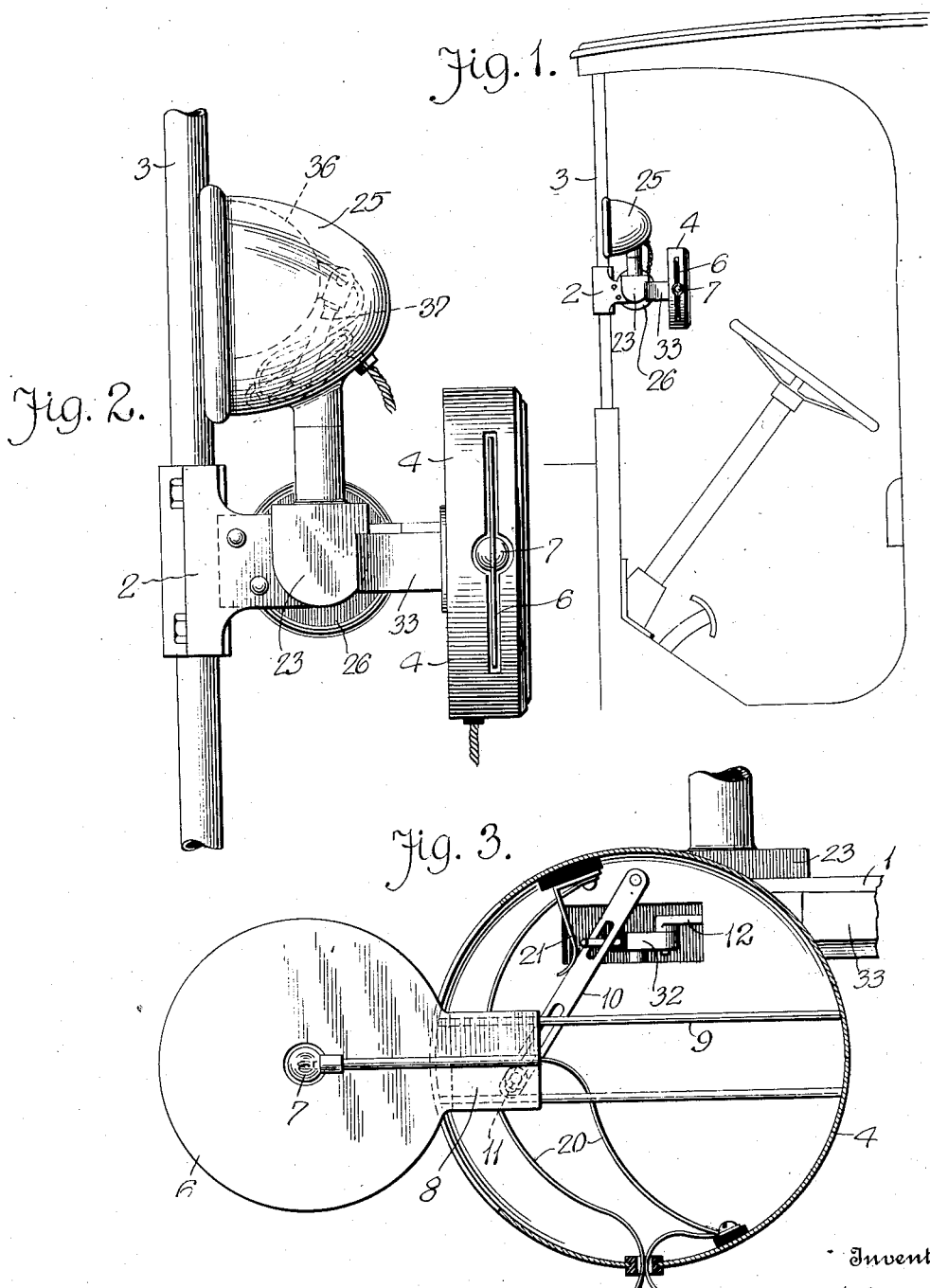

1,259,822.

Patented Mar. 19, 1918.
2 SHEETS—SHEET 2.

Witnesses
Chas. W. Stauffiger
Charles Balg

Inventor
Charles E. Archer,
Edward C. Humphreys,
Barthel & Barthel

UNITED STATES PATENT OFFICE.

CHARLES E. ARCHER AND EDWARD C. HUMPHREYS, OF DETROIT, MICHIGAN.

SIGNALING DEVICE FOR VEHICLES.

1,259,822. Specification of Letters Patent. Patented Mar. 19, 1918.

Application filed July 28, 1916. Serial No. 111,851.

*To all whom it may concern:*

Be it known that we, CHARLES E. ARCHER and EDWARD C. HUMPHREYS, citizens of the United States of America, residing at Detroit, in the county of Wayne and State of Michigan, have invented certain new and useful Improvements in Signaling Devices for Vehicles, of which the following is a specification, reference being had therein to the accompanying drawings.

This invention relates to a signal and headlight device for automobiles and to an arrangement thereof whereby the operator is enabled to give advice to passing traffic of his intention as to movement, can also observe vehicles to the rear of his car, and can illuminate any portion of the path at the front or side of the vehicle which he desires to.

The invention consists in the matters hereinafter set forth, and more particularly pointed out in the appended claim.

In the drawings,

Figure 1 is a view in elevation of a portion of a vehicle equipped with a device embodying features of the invention;

Fig. 2 is a view in side elevation of a device in one position;

Fig. 3 is a view in rear elevation, partially broken away and in section of a portion of the apparatus, with a signal member projected, electrical connections being shown in detail;

Figure 4:
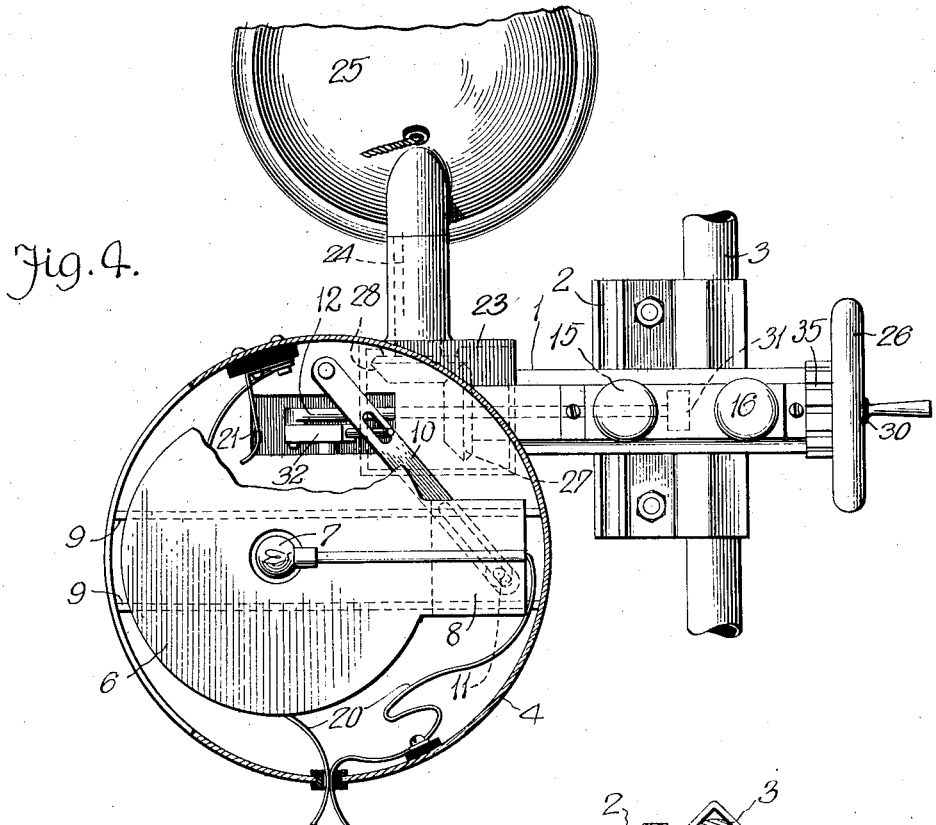
Fig. 4 is a view, partially in rear elevation and partially in section of the device, with parts shown in Fig. 3 indicated in retracted position.
Figure 5:
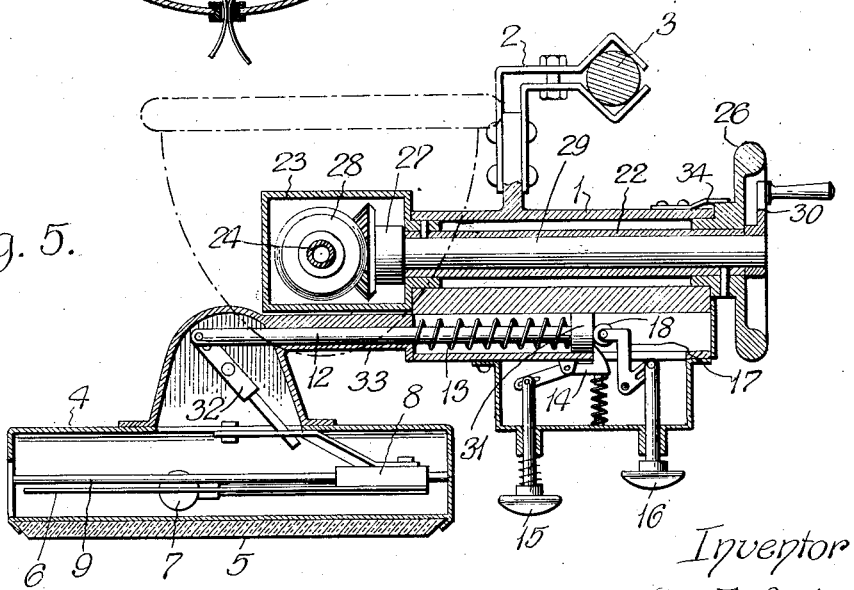
Fig. 5 is a view in horizontal section of the device.

As herein shown, a casing 1 is adapted to be secured as by suitable clips 2 in a windshield frame 3 or the like of an automobile in such position as to be in operative relation to the driver of the vehicle when the latter is at the steering wheel. A bracket arm that projects from the casing 1 carries at the outer end portion a housing 4 having a reflector or mirror 5 on the rear face. A signal member 6, illuminated if desired by means of a suitable incandescent bulb 7, is mounted in the housing 4, by an arm 8 longitudinally reciprocable on guides 9. When in retracted position behind the mirror a slotted lever 10 engaging a stud 11 on the slide portion 8 coöperates with a lever 32 and a stem 12 that is longitudinally reciprocable in the member 33 to compress a spring 13, a latch 14 with finger release push button 15 retaining the parts. When the push button 15 is moved inwardly so that the latch 14 disengages the member 12, the signal member 6 is projected and at the same time a finger button 16 is extended through the medium of a bell crank lever 17 having a friction roll 18 bearing against the end of the member 21. By manipulation of the button 16, the parts may be returned to retracted position.

The bulb 7 on the signal arm 6 is thrown into circuit with the car illuminating system or other source of electrical energy, by appropriate connections indicated at 20 with which a spring switch arm 21 is in series through the lever 10 so that when the lever 10 is projected, contact is made to energize the bulb.

A hollow shaft 22 that is rotatable in the casing 1, has a lateral hollow extension 23 which affords bearing for a spindle 24 on the outer end portion of which a headlight 25 is mounted. A suitable hand wheel 26 keyed on one end of the hollow sleeve and having a bearing in the casing permits vertical tilting or deflection of the lamp 25 to throw its beam in any desired direction in a vertical plane.

To hold the reflector lamp at any desired angle, a spring finger 34 is secured to the casing 1 and engages grooves 35 on the end of the hand wheel 26.

A beveled pinion 27 meshes with a gear 28 carried by an upright shaft 24 journaled in the hollow extension 23 and adapted to be turned by a suitable handle 30 mounted on the longitudinal spindle 29 or the like. This permits horizontal oscillation of the lamp 25 so that by appropriate action of the wheel 26 and the handle 30 the operator can direct the light in any desired direction. Preferably, the bulb of the headlight 25 is carried in a reflector 36 that is mounted on a handle 37 with an extension cord, the whole being withdrawable from the headlight for use as a hand torch or trouble or flash lamp.

As a result of this construction a traffic signal and headlight is obtained that permits the operator to observe the condition of the road, observe traffic that is coming from the rear and at the same time signal traffic whenever the driver intends to slow down or stop while the headlight is under his control for direction to any desired point.

Obviously, changes in the details of construction may be made without departing from the spirit of our invention and we do not care to limit ourselves to any particular form or arrangement of parts.

What we claim is:—

A signal comprising a bracket arm, a housing carried thereby and having a side opening, guides in said housing, a signal member on said guides to be laterally projected out of the side opening of said housing, a stem slidable in said bracket arm, a lever in said housing connected to said stem and adapted for shifting said signal member; a spring on said stem adapted to have the expansive force thereof shift said stem, lever, and signal member; a latch engaging the end of said stem and adapted to hold said signal member in a retracted position in said housing, and means extending into said bracket and adapted for shifting said stem so that the spring may be placed under compression and said signal member shifted to a retracted position.

In testimony whereof we affix our signatures in presence of two witnesses.

CHARLES E. ARCHER.
EDWARD C. HUMPHREYS.

Witnesses:
C. R. STICKNEY,
ANNA M. DORR.